US011190565B2

(12) United States Patent
Fawcett et al.

(10) Patent No.: US 11,190,565 B2
(45) Date of Patent: Nov. 30, 2021

(54) OPERATOR TO PROCESSING ELEMENT ASSIGNMENT IN AN ACTIVE STREAM PROCESSING JOB

(71) Applicant: International Business Machines Corporation, Armonk, NY (US)

(72) Inventors: Bradley William Fawcett, Byron, MN (US); Henry Chiu, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 218 days.

(21) Appl. No.: 16/244,828

(22) Filed: Jan. 10, 2019

(65) Prior Publication Data

US 2020/0228587 A1    Jul. 16, 2020

(51) Int. Cl.
*G06F 9/50*  (2006.01)
*H04L 29/06*  (2006.01)
*H04L 12/26*  (2006.01)
*G06F 15/80*  (2006.01)

(52) U.S. Cl.
CPC .......... *H04L 65/602* (2013.01); *G06F 9/5072* (2013.01); *G06F 9/5088* (2013.01); *G06F 15/80* (2013.01); *H04L 43/04* (2013.01); *H04L 65/608* (2013.01)

(58) Field of Classification Search
CPC ..... H04L 65/602; H04L 65/608; H04L 43/04; G06F 9/5072; G06F 15/80
See application file for complete search history.

(56) References Cited

U.S. PATENT DOCUMENTS

| 9,189,449 | B2 | 11/2015 | Branson et al. |
| 10,042,663 | B2 | 8/2018 | Bragstad et al. |
| 10,733,209 | B2 * | 8/2020 | Cao ...................... G06F 16/285 |
| 2013/0013549 | A1 * | 1/2013 | Chang ................... G06Q 50/01 706/48 |
| 2013/0145203 | A1 * | 6/2013 | Fawcett .............. G06F 9/30007 714/3 |
| 2015/0222696 | A1 | 8/2015 | Park et al. |
| 2017/0091283 | A1 * | 3/2017 | Cao ................... G06F 16/24568 |
| 2017/0154081 | A1 * | 6/2017 | Barsness ............... G06F 16/285 |
| 2017/0168748 | A1 * | 6/2017 | Barsness ............... G06F 3/0653 |
| 2017/0269911 | A1 * | 9/2017 | Barsness .................. G06F 8/20 |
| 2017/0308363 | A1 * | 10/2017 | Barsness ................ G06F 8/436 |
| 2017/0308376 | A1 * | 10/2017 | Barsness ................ G06F 8/443 |
| 2017/0308456 | A1 * | 10/2017 | Barsness ............... G06F 9/44521 |
| 2017/0308457 | A1 * | 10/2017 | Barsness ................ G06F 8/436 |
| 2017/0308458 | A1 * | 10/2017 | Cancilla ............. G06F 11/3636 |

(Continued)

*Primary Examiner* — James R Sheleheda
(74) *Attorney, Agent, or Firm* — Garg Law Firm, PLLC; Rakesh Garg; William Hartwell

(57) ABSTRACT

Within a portion of a currently executing compiled streams application according to a request to modify a configuration of the portion, a placement is performed of an operator of the currently executing compiled streams application into a processing element, wherein the currently executing compiled streams application has a configuration assigned before application execution began. In response to the placement, a resource allocation corresponding to the placement is performed according to the request, the resource allocation specifying a resource assigned to the processing element. The processing element is activated to execute the operator according to the placement and the resource allocation.

20 Claims, 7 Drawing Sheets

(56) References Cited

U.S. PATENT DOCUMENTS

2017/0337067 A1* 11/2017 Cradick .............. G06F 11/3414
2017/0344600 A1   11/2017 Eidem et al.
2019/0392139 A1* 12/2019 Nikolai ................ G06F 21/552

* cited by examiner

OPERATOR TO PROCESSING ELEMENT ASSIGNMENT IN AN ACTIVE STREAM PROCESSING JOB

TECHNICAL FIELD

The present invention relates generally to a method, system, and computer program product for resource reassignment in a stream processing environment. More particularly, the present invention relates to a method, system, and computer program product for operator to processing element assignment in an active stream processing job.

BACKGROUND

Stream computing is a relatively new paradigm. Traditional data processing typically involves queries run against static data, for example data held in a database or other data repository, providing a static query result set for further analysis. Stream computing, in contrast, performs a query on a continuous stream of data and produces a continuous stream of query results. Sensors, cameras, news feeds, and stock tickers are just a few examples of sources of continuous streams of data amenable to processing in a stream computing environment. As with traditional static data, streams of data may be numeric, text, audio, video, or any other type of data.

As used herein, a tuple is an individual piece of data in a stream. The data in a tuple can be structured or unstructured. Typically, the data in a tuple represents a state at a specific point in time. For example, data in a tuple might represent a temperature reading or a price of a publicly traded stock at a particular second. A data stream, or stream, is a sequence of tuples. For example, a data stream might represent a sequence of once-per-minute temperature readings or a sequence of stock prices through a trading day.

As used herein, an operator performs an action on tuples in a data stream. Operators are the fundamental building blocks of stream processing applications.

A stream application is software that specifies a defined collection of at least one operator and at least one data stream processed by the operator. Thus, a stream application defines how operator runtime code should process stream data. A stream application can also be represented as a data flow graph. Each node of the graph represents an operator, and one or more data streams flow between nodes, in a specified direction. Operators may be arranged in series, parallel, or a combination, and have zero or more input streams and zero or more output streams.

A simple example stream application includes three example operators, arranged in series. The first operator, FileSource( ), reads data from a file and submits the data to the output stream of FileSource( ) as individual tuples in a data stream. The second operator, Filter( ), has an input stream connected to the output stream of FileSource( ). Filter( ) receives the data stream from FileSource( ) and outputs a filtered data stream consisting only of tuples that satisfy a condition specified in a parameter of Filter( ). The third operator, FileSink( ), has an input stream connected to the output stream of Filter( ). FileSink( ) receives the data stream from Filter( ) and writes the data stream to a file instead of outputting another data stream.

During application design, operators defined in the application are assigned unique names with which to reference individual operators. For ease in development, deployment, and reconfiguration, names are typically assigned according to a naming convention. When a stream application is configured for execution, the operators are placed onto one or more individual execution units, also called processing elements (PEs). A PE performs tuple processing for one or more operators, and fusing is the process of placing operators together into a common PE. A PE runs on a host, also called a resource. A host supports execution of one or more PEs, and may be a physical machine, virtual machine, or another computing entity capable of executing a PE.

Configuring a stream application for execution includes specifying operator placement within PEs and resource usage for PEs. A configuration adapted to the application, quantity and type of data to be processed, and the environment in which the application executes improves application throughput and performance. Job-appropriate placement of operators into PEs is important for performance. Because PE-internal communication is faster than cross-PE communication, grouping together operators that share a large quantity of data with each other may be more efficient than separating the operators. However, if fewer operators share a PE each operator will have access to a larger share of the PE's execution capability. Thus, configuring a stream application includes specifying which operators should be placed in the same PE, or which operators should not share a PE.

Configuring a stream application includes specifying any parallel region channels. Parallel regions are duplicate regions of a portion of an application, used to improve processing throughput. If an operator is overloaded by processing an incoming data stream, a duplicate operator, processing the same data stream, can be added to share the load and improve throughput. Similarly, if a region, or portion, of an application is overloaded, the entire region can be duplicated to share the load.

Some operators can also be expected to use more host resources, or more of a particular type or size of host resource. Thus, configuring a stream application to accommodate particular operators includes specifying whether an operator should only execute on a particular host or a host in a particular host pool (a set of resources designated for a particular purpose), as well as specifying which operators should execute on the same host or which operators should not share a host.

Configuring a stream application also includes specifying how operators are distributed among PEs and how PEs are distributed among hosts. For example, for most overall efficiency, one might specify that PEs are to be balanced across resources based on the capacity and current load of the resources. Alternatively, for the most predictable placement, one might specify that PEs are to balanced only within a particular job, or executing instance of a stream application, without accounting for other jobs that might also be executing in the stream processing environment. As well, one might specify which resources can host which PEs, including that a set of PEs can share a set of resources (e.g. within one host or one host pool), and which PEs cannot share a particular resource or set of resources.

As in traditional data processing, a stream application must be compiled before execution. However, unlike traditional data processing, a compiled stream application also includes operator, PE, and resource configuration information. As well, when a job is submitted for execution, the submitter has the option to modify the compiled configuration information, allowing a particular job to be configured to the environment in which the job is to be run. Then at runtime, a scheduler configures operators and data streams onto PEs, PS onto and resources, and the operators begin executing code on the tuples in one or more data streams.

SUMMARY

The illustrative embodiments provide a method, system, and computer program product. An embodiment includes a method that performs a placement, within a portion of a currently executing compiled streams application according to a request to modify a configuration of the portion, of an operator of the currently executing compiled streams application into a processing element, wherein the currently executing compiled streams application has a configuration assigned before application execution began. An embodiment performs, in response to the placement, a resource allocation corresponding to the placement according to the request, the resource allocation specifying a resource assigned to the processing element. An embodiment activates, to execute the operator, the processing element according to the placement and the resource allocation.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
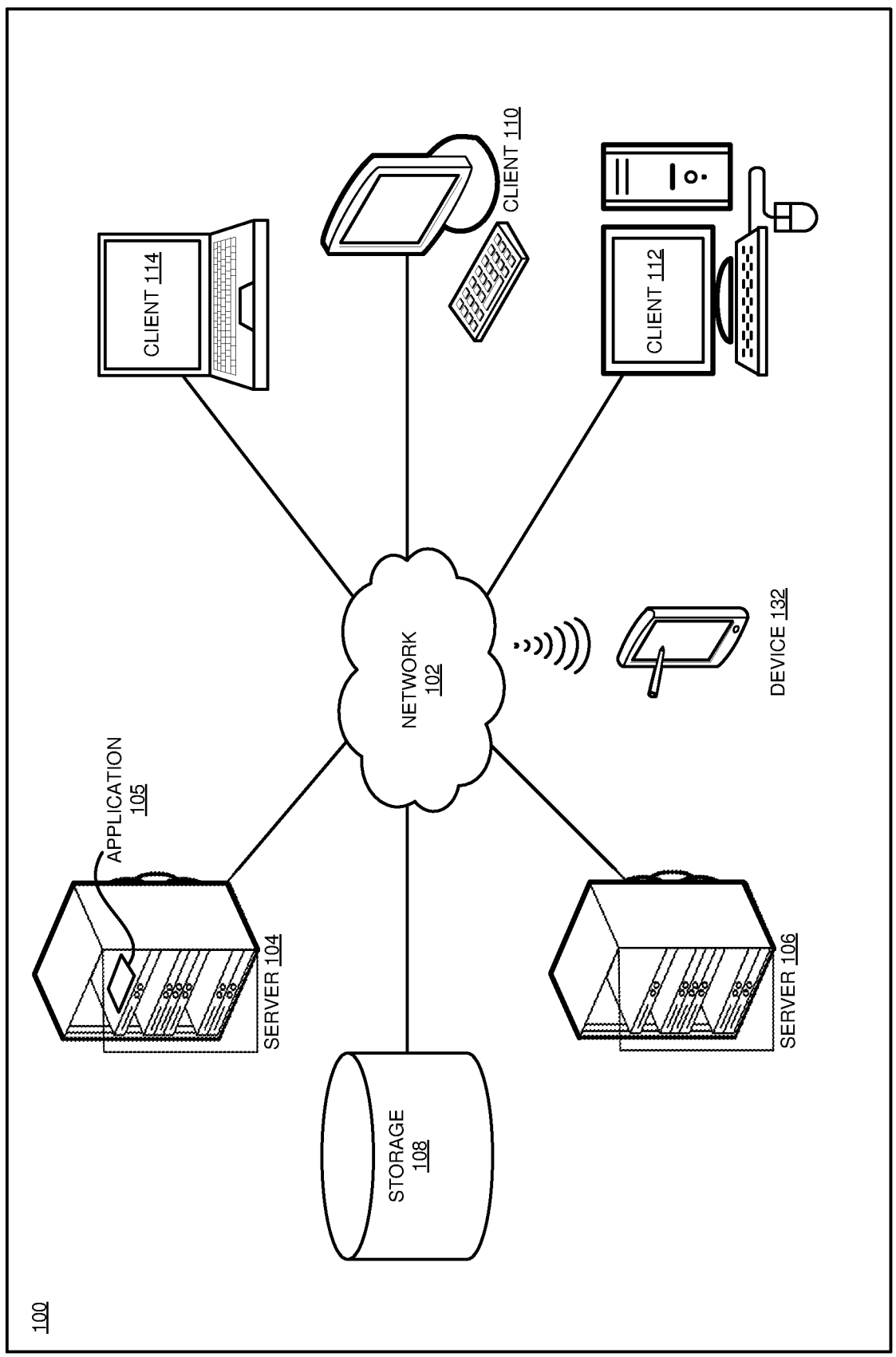
FIG. 1 depicts a block diagram of a network of data processing systems in which illustrative embodiments may be implemented.

The illustrative embodiments recognize that, when a job is submitted for execution, a job scheduler configures the job based on the specified configuration instructions and resource availability at the time of deployment. However, because a job processes a continuous stream of data, the job itself may execute for up to two to three months.

The illustrative embodiments recognize that as a job runs, the work load processed by the job may change. An input data stream may provide less, or more, data than initially expected. The type of data in a data stream may also change. As a result, operators processing some data may become overloaded, and some underloaded. Overloaded operators slow overall application throughput, while the underutilized PEs and resources assigned to underloaded operators could be better used elsewhere. As well, because some jobs are priced according to the jobs' resource allocations, customers prefer to release underutilized resources.

The illustrative embodiments recognize that as a job runs, available processing resources may change. For example, a new resource may have become available for use.

The illustrative embodiments recognize that as a job runs, monitoring of job execution may identify portions of the job where performance improvements could be realized by reconfiguring operators and PEs in response to changing circumstances, or multiple operator/PE configurations evaluated for corresponding performance improvements. For example, a duplicate operator could be added to process a data stream in parallel with an existing operator, related operators could be grouped together within a single PE, or previously-grouped operators could be separated so that each operator runs alone in a PE.

The illustrative embodiments recognize that as a job runs, there may be other reasons to reconfiguring operators and PEs. For example, it may be advantageous, when debugging an executing stream application, to place certain types of operators into their own PEs to better analyze the operators' operation in isolation.

Thus, the illustrative embodiments recognize that there is a need to adjust a job configuration while the job is executing.

The illustrative embodiments recognize that the presently available tools or solutions do not address these needs or provide adequate solutions for these needs. The illustrative embodiments used to describe the invention generally address and solve the above-described problems and other problems related to operator to processing element assignment in an active stream processing job.

An embodiment can be implemented as a software application. The application implementing an embodiment can be configured as a modification of an existing stream processing system, as a separate application that operates in conjunction with an existing stream processing system, a stand-alone application, or some combination thereof.

Particularly, some illustrative embodiments provide a method that, in response to a request to modify a configuration of a portion of a currently executing compiled stream application, performs a placement of an operator into a PE, performs a resource placement for the PE, and activates the PE according to the operator and resource placements.

An embodiment accepts a specification of a stream application region to reconfigure, also called a target region, within a job. An external job monitoring process, a human administrator, or a combination of an external process and a human may have identified the target region as one requiring reconfiguration, either within the target region or for the overall job.

Because the target region is defined by the operators within the region, the region specification is simply a list of the unique names of one or more operators in the target region. An operator naming convention and wild card capability allow additional specification options. For example, in a stream processing environment that uses a common prefix for the names of operators in each different region of an application, selecting an appropriate wild card option for a particular prefix allows one to specify all the operators in a region using one operator name. For example, if each operator in the ingest region of an application has an "Ingest_" prefix in the operator name (e.g. "Ingest_Filesource_a", Ingest_Filter_a", etc.) one can specify all the operators in the ingest region of this application using "Ingest_*". Additional specification options allow specification of all the operators associated with a particular resource, all the operators in a particular PE, all the operators having a particular number of input streams or output streams (e.g. all the operators that do not have an output stream), all the operators of a particular type (e.g. the Filter( ) operators), and the like. Other operator name specification options are also possible and contemplated within the scope of the illustrative embodiments.

An embodiment also accepts a specification of an updated application configuration. The specified application configuration includes any configuration that could have been specified at compile time or at job submittal, including specification of one or more of operator placement within PEs and resource allocation for PEs. Configuring a stream application also includes specifying any parallel region channels, whether an operator should only execute on a particular host or a host in a particular host pool, and which operators should execute on the same host or which operators should not share a host. Configuring a stream application also includes specifying which operators or types of operators should be placed in a common PE, which operators or types of operators should not share a PE, how operators are distributed among PEs and how PEs are distributed among hosts, as well as whether a particular set of PEs can share a set of resources, and which PEs cannot share a particular resource or set of resources. Additional application configurations are also possible and contemplated within the scope of the illustrative embodiments.

Consider an example scenario: an administrator, monitoring resource metrics for a particular job, notices that the ingest section of the job has slowed, affecting throughput for the entire job. The administrator specifies the ingest section as the target region, and specifies an updated application configuration: a number of parallel processing channels within the target region, as well as additional resources to host the added operators executing the parallel processing channels, should be added to the job, the operators (both existing and newly-added) in the target region should be redistributed across PEs in the target region, and the PEs in the target region should be redistributed across available resources (both existing and newly-added).

Consider a second example scenario: an administrator notices that a set of operators processing data from a particular set of sensors are not able to keep up with the data coming from the sensors. The administrator specifies the set of operators as the target region, and specifies an updated application configuration: this set of operators should be placed together into one PE, and the PE placed on a resource designated as fast.

An embodiment retrieves a topology representing a currently executing job to be reconfigured according to the application configuration specification. The topology includes a data flow graph corresponding to the job, as well as associated job configuration and constraint information for the current state of the job.

An embodiment fully defines a target region within the topology, based on the received specification. The target region, when fully defined, includes each specified operator, each PE a specified operator executes on, and each resource used by each PE a specified operator executes on.

From the received specification of an updated application configuration, an embodiment determines the particular adjustments to be made within the target region. In particular, an embodiment specifies any necessary configurations of operators within processing elements, and any constraints on configurations of operators within processing elements. An embodiment specifies any resources to be added or removed from a PE. An embodiment specifies any resource specification changes for a PE. Resource specifications include, for example, resources tagged as small or large (or slow or fast) within a particular stream processing environment, which resources can host which PEs, which PEs can share a resource or set of resources, and which PEs cannot share a particular resource or set of resources. An embodiment also specifies topology changes to the target region within the currently executing job. For example, adding, removing, or adjusting parallel region channels causes topology changes by potentially adding or removing operators within the job along with data streams connecting the operators.

An embodiment makes the adjustments to the target region without affecting the operation of portions of the job outside the target region. In particular, PEs executing the job that do not contain a target operator continue to execute on their assigned resources without a PE or resource change. To maintain tuple integrity while operators are being reconfigured, tuples entering the target region are held until reconfiguration is complete, then allowed to enter the target region for processing as before the reconfiguration.

Within the target region and according to the specified adjustments, an embodiment places any specified operators into one or more processing elements. An operator being placed is referred to as a target operator, and the PE the target operator is running on is referred to as an initial PE. To place a target operator that is currently executing, an embodiment first saves the state of the target operator, as well as any other operators that may also be running on the initial PE. An embodiment saves an operator state in a host-independent manner, to allow the operator state to be restored onto a different host once reconfiguration is complete. Once the states of all operators on the initial PE have been saved, the initial PE is stopped and retired from use. The target operator is placed into a new PE. If necessitated by the specified adjustments, an embodiment creates a new target operator and places the new target operator into a new PE. Depending on the necessary adjustments, any operator being moved and any newly-created operator can be grouped into one or more new PEs in any combination. Non-targeted operators that were running in the initial PE are moved, as a group, to another new PE, because the initial PE has been stopped and retired. Once placed into a new PE, an embodiment restores the state of any operator with a pre-move saved state.

An embodiment places a new PE onto a resource according to any resource specifications and the needs of any operator placed on the new PE. Resource placement is computed by satisfying specific placement constraints, such as constraints specifying that two operators must run on the same resource or a different resource. Resource placement can also be influenced by resource capacity (e.g. memory, processor, network bandwidth), and the number of PEs already running on the resource executing other jobs. Resource placement takes into account the specified PE and operator adjustments and current load metrics to determine the best resource to allocate to the PE.

Once operator placement and corresponding resource placement have been completed for new PEs in the target region, an embodiment activates the PEs and begins allowing tuples, both previously held and new, into the target region for processing. The embodiment also stores an updated topology representing the new configuration of the job, for use in a potential further job reconfiguration.

The manner of operator to processing element assignment in an active stream processing job described herein is unavailable in the presently available methods. A method of an embodiment described herein, when implemented to execute on a device or data processing system, comprises substantial advancement of the functionality of that device or data processing system in, in response to a request to modify a configuration of a portion of a currently executing compiled stream application, performing a placement of an operator into a PE, performing a resource placement for the PE, and activating the PE according to the operator and resource placements without affecting the remainder of the application.

The illustrative embodiments are described with respect to certain types of operators, data streams, stream processing environments, stream processing applications, jobs, resources, hosts, processing elements, specifications, constraints, configurations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
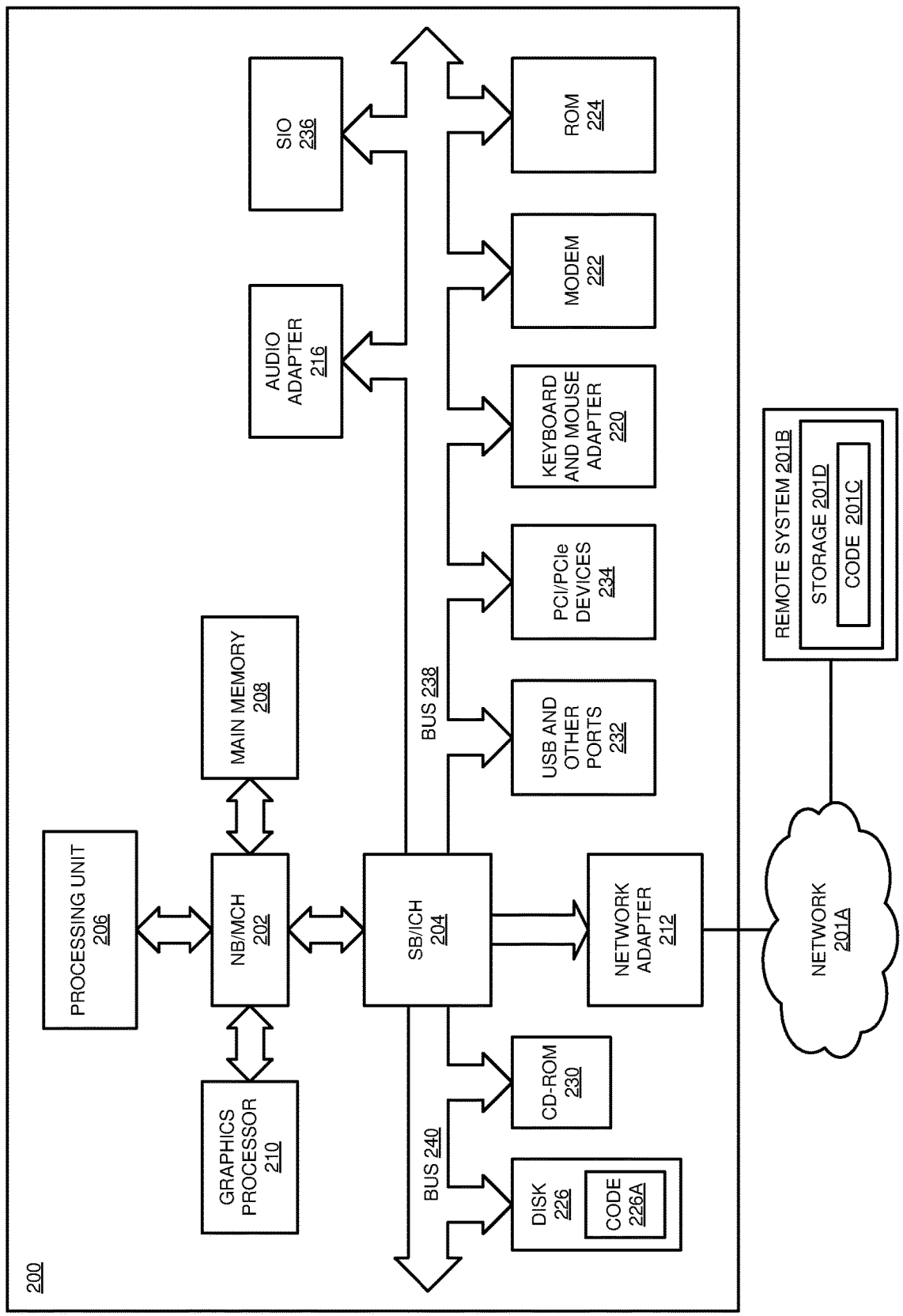
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in a stream processing system, for example a stream processing system hosted on servers 104 or 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
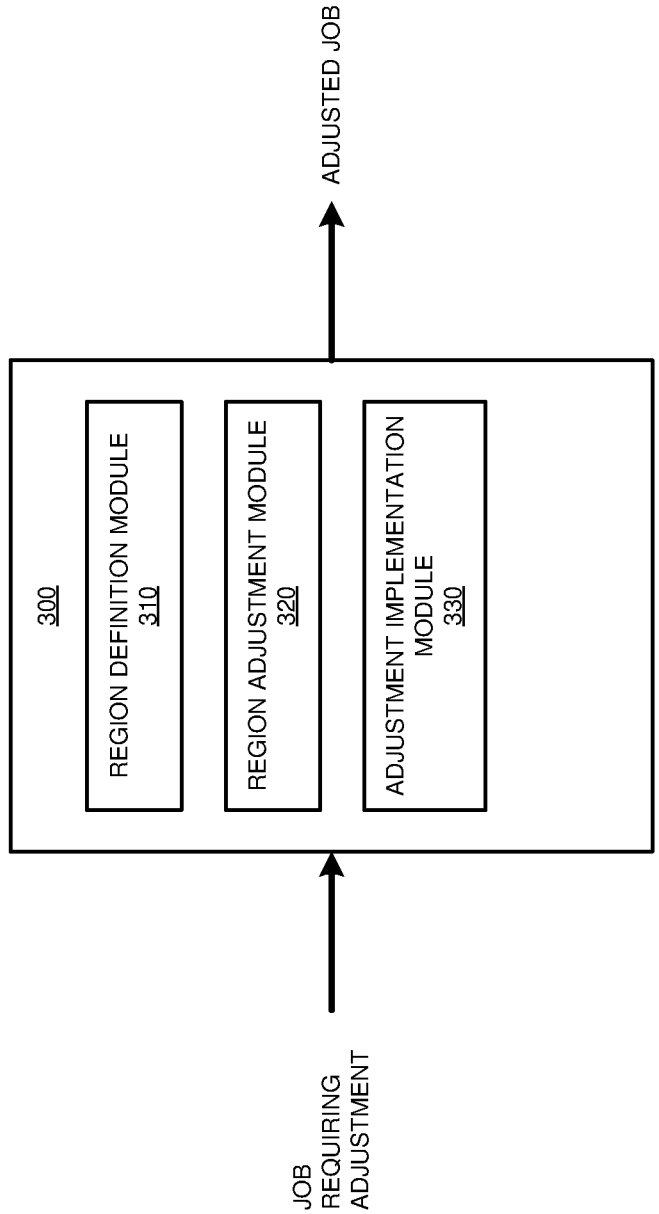
FIG. 3 depicts a block diagram of an example configuration for operator to processing element assignment in an active stream processing job in accordance with an illustrative embodiment.

With reference to FIG. 3, this figure depicts a block diagram of an example configuration for operator to processing element assignment in an active stream processing job in accordance with an illustrative embodiment. Application 300 is an example of application 105 in FIG. 1 and executes in server 104 or 106 in FIG. 1.

Region definition module 310 fully defines a target region within the topology, based on the received specification. The target region, when fully defined, includes each specified operator, each PE a specified operator executes on, and each resource used by each PE a specified operator executes on. From the received specification of an updated application configuration, region adjustment module 320 determines the particular adjustments to be made within the target region. Adjustment implementation module 330 makes the adjustments to the target region without affecting the operation of portions of the job outside the target region.

Figure 4:
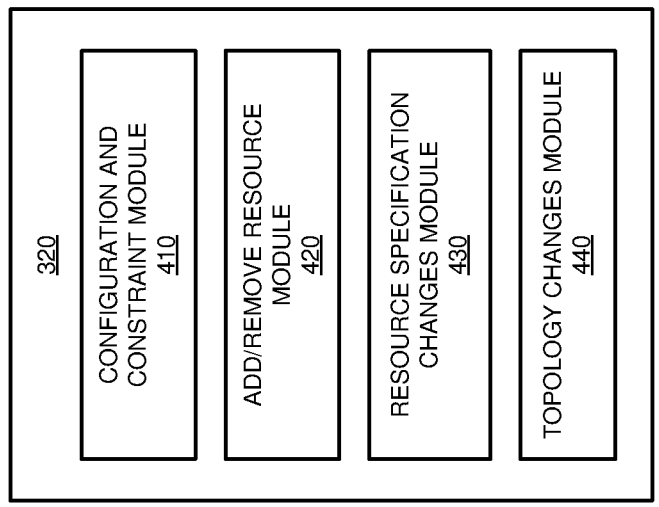
FIG. 4 depicts a block diagram of further detail of an example configuration for operator to processing element assignment in an active stream processing job in accordance with an illustrative embodiment.

With reference to FIG. 4, this figure depicts a block diagram of further detail of an example configuration for operator to processing element assignment in an active stream processing job in accordance with an illustrative embodiment. In particular, FIG. 4 depicts more detail of region adjustment module 320 in FIG. 3.

Configuration and constraint module 410 specifies any necessary configurations of operators within processing elements, and any constraints on configurations of operators within processing elements. Add/remove resource module 420 specifies any resources to be added or removed from a PE. Resource specification changes module 430 specifies any resource specification changes for a PE, including, for example, resources tagged as small or large (or slow or fast) within a particular stream processing environment, which resources can host which PEs, which PEs can share a resource or set of resources, and which PEs cannot share a particular resource or set of resources. Topology changes module 440 specifies topology changes to the target region.

Figure 5:
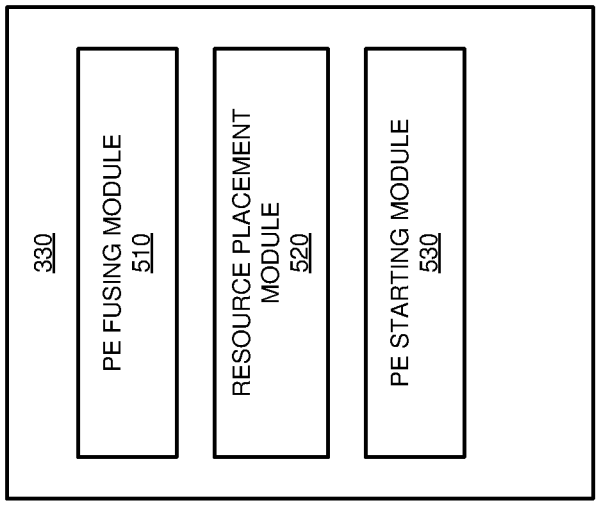
FIG. 5 depicts a block diagram of further detail of an example configuration for operator to processing element assignment in an active stream processing job in accordance with an illustrative embodiment.

With reference to FIG. 5, this figure depicts a block diagram of further detail of an example configuration for operator to processing element assignment in an active stream processing job in accordance with an illustrative embodiment. In particular, FIG. 5 depicts more detail of adjustment implementation module 330 in FIG. 3.

Adjustment implementation module 330 makes the adjustments to the target region without affecting the operation of portions of the job outside the target region. To maintain tuple integrity while operators are being reconfigured, tuples entering the target region are held until reconfiguration is complete, then allowed to enter the target region for processing as before the reconfiguration.

To place a target operator that is currently executing, PE fusing module 510 first saves the state of the target operator, as well as any other operators that may also be running on the initial PE. Once the states of all operators on the initial PE have been saved, the initial PE is stopped and retired from use. The target operator is placed into a new PE. If necessitated by the specified adjustments, PE fusing module 510 creates a new target operator and places the new target operator into a new PE. Depending on the necessary adjustments, any operator being moved and any newly-created operator can be grouped into one or more new PEs in any combination. Non-targeted operators that were running in the initial PE are moved, as a group, to another new PE, because the initial PE has been stopped and retired. Once placed into a new PE, an embodiment restores the state of any operator with a pre-move saved state. Resource placement module 520 places a new PE onto a resource according to any resource specifications and the needs of any operator placed on the new PE. Once operator placement and corresponding resource placement have been completed for new PEs in the target region, PE starting module 530 activates the PEs and begins allowing tuples, both previously held and new, into the target region for processing.

Figure 6:
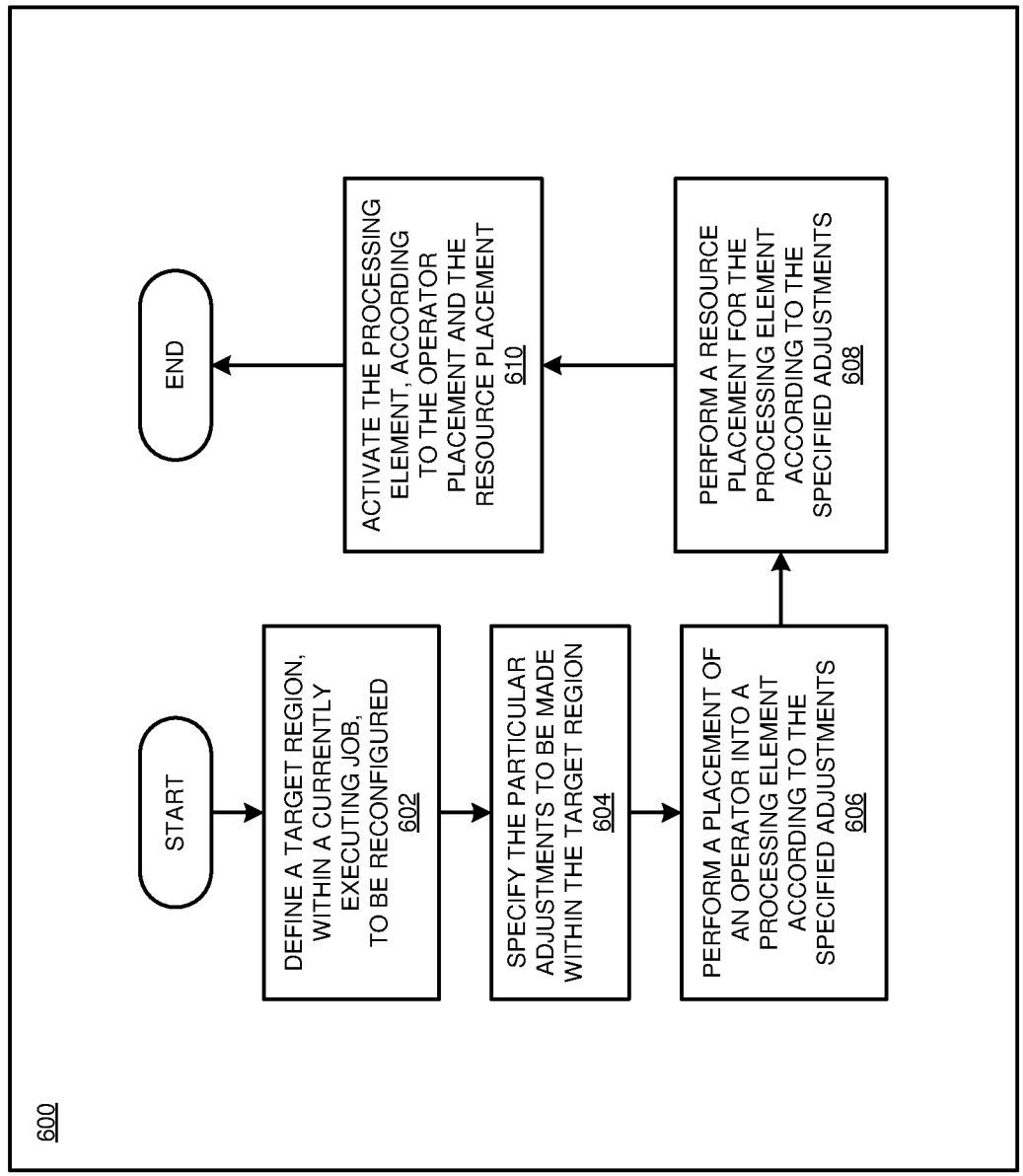
FIG. 6 depicts a flowchart of an example process for operator to processing element assignment in an active stream processing job in accordance with an illustrative embodiment.

With reference to FIG. 6, this figure depicts a flowchart of an example process for operator to processing element assignment in an active stream processing job in accordance with an illustrative embodiment. Process 600 can be implemented in application 300 in FIG. 3.

In block 602, the application defines a target region, within a currently executing job, to be reconfigured. In block 604, the application specifies the particular adjustments to be made within the target region. In block 606, the application performs a placement of an operator into a processing element according to the specified adjustments. In block 608, the application performs a resource placement for the processing element according to the specified adjustments. In block 610, the application activates the processing element according to the operator placement and the resource placement. Then the application ends.

Figure 7:
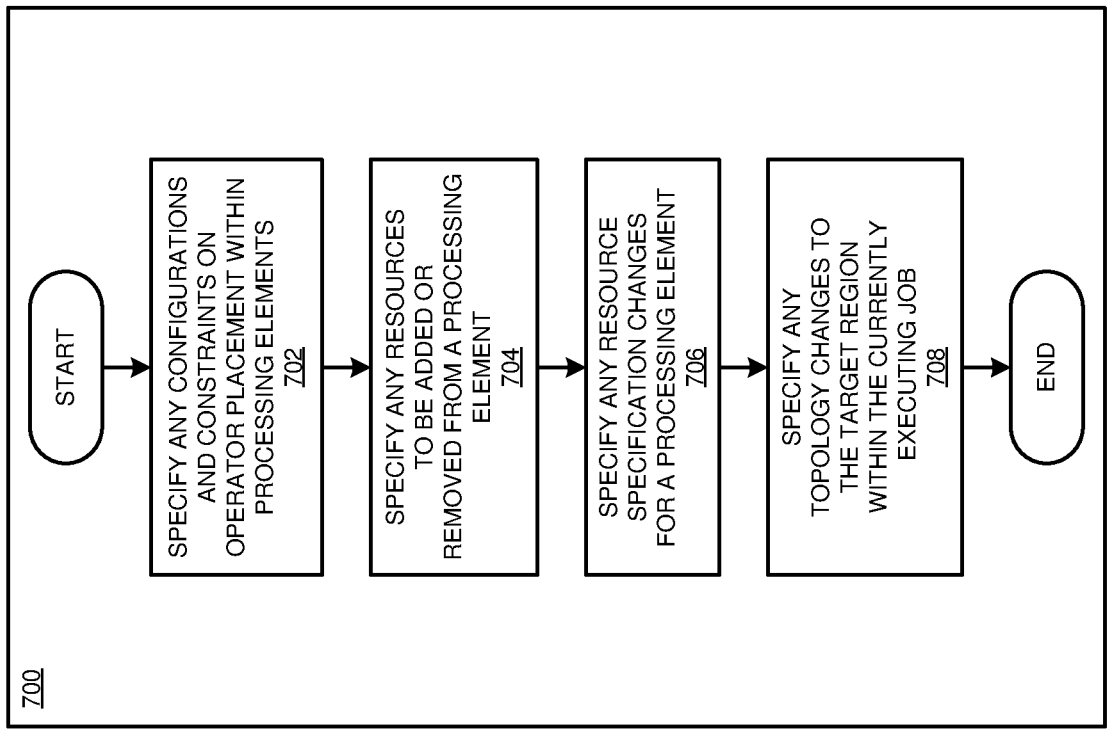
FIG. 7 depicts a flowchart of a portion an example process for operator to processing element assignment in an active stream processing job in accordance with an illustrative embodiment.

With reference to FIG. 7, this figure depicts a flowchart of a portion an example process for operator to processing element assignment in an active stream processing job in accordance with an illustrative embodiment. Process 700 gives more detail of block 604 in FIG. 3 and can be implemented in application 300 in FIG. 3.

In block 702, the application specifies any configurations and constraints on operator placement within processing elements. In block 704, the application specifies any resources to be added or removed from a processing element. In block 706, the application specifies any resource specification changes for a processing element. In block 708, the application specifies any topology changes to the target region within the currently executing job. Then the application ends.

Thus, a computer implemented method, system or apparatus, and computer program product are provided in the illustrative embodiments for operator to processing element assignment in an active stream processing job and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
defining within a topology a target region, wherein the topology represents a currently executing job in a data processing environment, wherein the topology further comprises a data flow graph corresponding to the job, and wherein the target region is specified within the topology by a set of operators executing in the target region, the set of operators specified using a search string specifying a set of operator names named according to an operator naming convention, the search string including a wild card;
initiating a reconfiguring of the target region, the reconfiguring comprising performing a placement, within a portion of a currently executing compiled streams application according to a request to modify a configuration of the portion, of an operator of the currently executing compiled streams application into a processing element, wherein the currently executing compiled streams application has a configuration assigned before application execution began, the processing element executing in a host system in the data processing environment, the processing element selected for operator placement according to a host system sharing restriction of the operator relative to a second operator currently executing using a second processing element of the host system;
holding, during the reconfiguring and until a completing of the reconfiguring, a data stream from entering the target region without affecting an operation of another portion of the currently executing compiled streams application;
performing, as a part of the reconfiguring, in response to the placement, a resource allocation corresponding to the placement according to the request, the resource allocation specifying a distribution among a set of host systems including the host system of a set of processing elements including the processing element;
activating, as a part of the reconfiguring, to execute the operator, the processing element according to the placement and the resource allocation;
completing the reconfiguring of the target region; and
allowing the data stream in holding from entering the target region to enter the target region.

2. The method of claim 1, wherein a second portion of the currently executing compiled streams application, the second portion excluding the portion, continues executing during the placement.

3. The method of claim 1, further comprising:
suspending, prior to performing the placement, an input data stream of the portion;
restoring, subsequent to the activating, the input data stream.

4. The method of claim 1, wherein the request specifies the operator requiring the placement.

5. The method of claim 4, wherein the operator is currently being executed by a first processing element.

6. The method of claim 5, wherein performing the placement of the operator comprises:
saving a first operator state of the operator;
deactivating the initial processing element;
selecting the processing element according to the request; and
restoring, from the saved first operator state, the state of the operator onto the processing element.

7. The method of claim 5, wherein an additional operator is currently being executed by a first processing element.

8. The method of claim 7, wherein performing the placement of the operator comprises:
saving a first operator state of the operator;
saving an additional operator state of the additional operator;
deactivating the initial processing element;
selecting the processing element and an additional processing according to the request;
restoring, from the saved first operator state, the state of the operator onto the processing element;
restoring, from the saved additional operator state, the states of the additional operator onto an additional processing element;
performing, an additional resource allocation, the additional resource allocation specifying an additional resource assigned to the additional processing element; and
activating, to execute the additional operator, the additional processing element according the additional resource allocation.

9. The method of claim 1, wherein the host system sharing restriction specifies that the operator and the second operator cannot execute in the same host system.

10. The method of claim 1, wherein the host system sharing restriction specifies that the operator and the second operator must execute in the same host system.

11. A computer usable program product comprising one or more computer readable storage medium, and program instructions stored on at least one of the one or more computer readable storage medium, the stored program instructions comprising:
program instructions to define within a topology a target region, wherein the topology represents a currently executing job in a data processing environment, wherein the topology further comprises a data flow graph corresponding to the job, and wherein the target region is specified within the topology by a set of operators executing in the target region, the set of operators specified using a search string specifying a set of operator names named according to an operator naming convention, the search string including a wild card;
program instructions to initiate a reconfiguring of the target region, comprising program instructions to perform a placement, within a portion of a currently executing compiled streams application according to a request to modify a configuration of the portion, of an operator of the currently executing compiled streams application into a processing element, wherein the currently executing compiled streams application has a configuration assigned before application execution began, the processing element executing in a host system in the data processing environment, the processing element selected for operator placement according to a host system sharing restriction of the operator relative to a second operator currently executing using a second processing element of the host system;
program instructions to hold, during the reconfiguring and until a completing of the reconfiguring, a data stream from entering the target region without affecting an operation of another portion of the currently executing compiled streams application;
program instructions to perform, as a part of the reconfiguring, in response to the placement, a resource allocation corresponding to the placement according to the request, the resource allocation specifying a distribution among a set of host systems including the host system of a set of processing elements including the processing element;
program instructions to activate, as a part of the reconfiguring, to execute the operator, the processing element according to the placement and the resource allocation;
program instructions to complete the reconfiguring of the target region; and
program instructions to allow the data stream in holding from entering the target region to enter the target region.

12. The computer usable program product of claim 11, wherein a second portion of the currently executing compiled streams application, the second portion excluding the portion, continues executing during the placement.

13. The computer usable program product of claim 11, further comprising:
program instructions to suspend, prior to performing the placement, an input data stream of the portion;
program instructions to restore, subsequent to the activating, the input data stream.

14. The computer usable program product of claim 11, wherein the request specifies the operator requiring the placement.

15. The computer usable program product of claim 14, wherein the operator is currently being executed by a first processing element.

16. The computer usable program product of claim 15, wherein program instructions to perform the placement of the operator comprises:
program instructions to save a first operator state of the operator;
program instructions to deactivate the initial processing element;
program instructions to select the processing element according to the request; and
program instructions to restore, from the saved first operator state, the state of the operator onto the processing element.

17. The computer usable program product of claim 11, wherein the computer usable code is stored in a computer readable storage medium in a data processing system, and wherein the computer usable code is transferred over a network from a remote data processing system.

18. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

19. A computer system comprising one or more processors, one or more computer-readable memories, and one or more computer readable storage medium, and program instructions stored on at least one of the one or more computer readable storage medium for execution by at least one of the one or more processors via at least one of the one or more memories, the stored program instructions comprising:
program instructions to define within a topology a target region, wherein the topology represents a currently executing job in a data processing environment, wherein the topology further comprises a data flow graph corresponding to the job, and wherein the target region is specified within the topology by a set of operators executing in the target region, the set of operators specified using a search string specifying a set of operator names named according to an operator naming convention, the search string including a wild card;
program instructions to initiate a reconfiguring of the target region, comprising program instructions to perform a placement, within a portion of a currently executing compiled streams application according to a request to modify a configuration of the portion, of an operator of the currently executing compiled streams application into a processing element, wherein the currently executing compiled streams application has a configuration assigned before application execution began, the processing element executing in a host system in the data processing environment, the processing element selected for operator placement according to a host system sharing restriction of the operator relative to a second operator currently executing using a second processing element of the host system;
program instructions to hold, during the reconfiguring and until a completing of the reconfiguring, a data stream from entering the target region without affecting an operation of another portion of the currently executing compiled streams application;

program instructions to perform, as a part of the reconfiguring, in response to the placement, a resource allocation corresponding to the placement according to the request, the resource allocation specifying a distribution among a set of host systems including the host system of a set of processing elements including the processing element;

program instructions to activate, as a part of the reconfiguring, to execute the operator, the processing element according to the placement and the resource allocation;

program instructions to complete the reconfiguring of the target region; and program instructions to allow the data stream in holding from entering the target region to enter the target region.

20. The computer system of claim 19, wherein a second portion of the currently executing compiled streams application, the second portion excluding the portion, continues executing during the placement.

* * * * *